Dec. 21, 1943.    R. P. STEADMAN ET AL    2,337,527
FEEDING MECHANISM FOR DOUGH TWISTING MACHINES
Original Filed Oct. 7, 1941    8 Sheets-Sheet 1
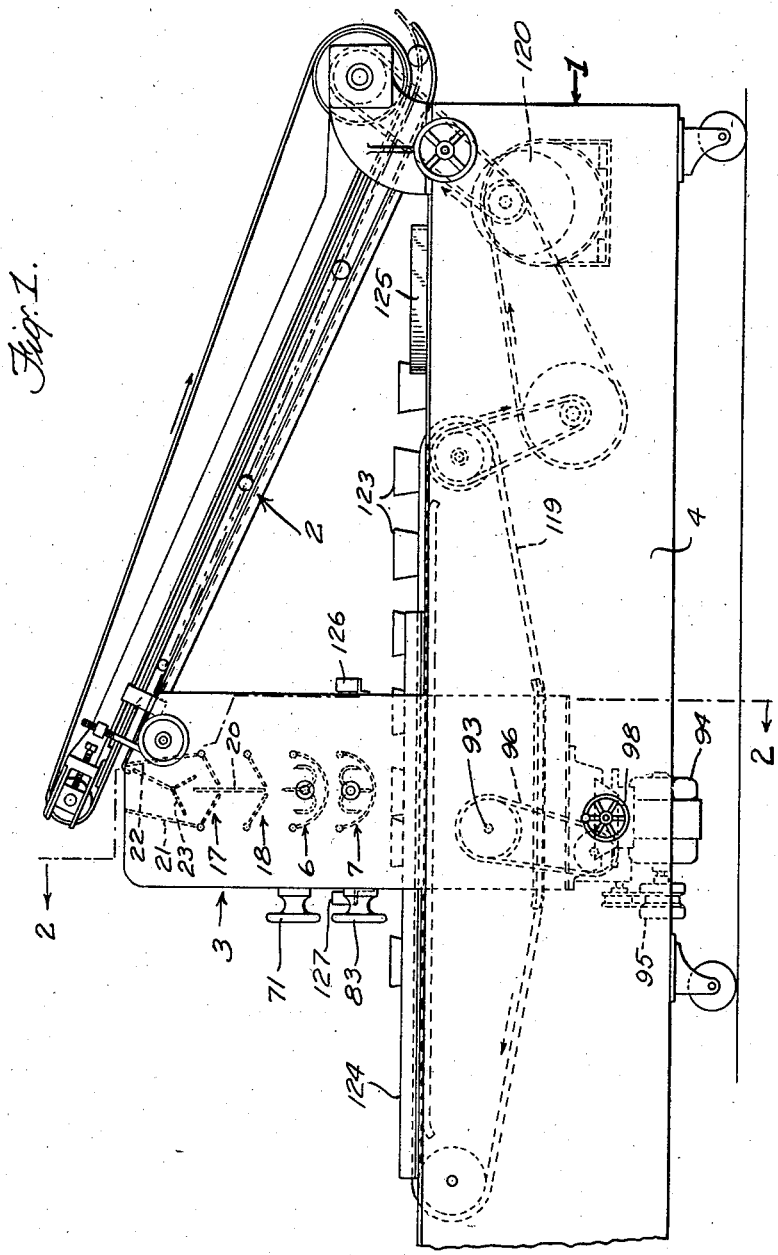
INVENTORS
RUFFUS P. STEADMAN
ALBERT O. RIORDAN.
BY
ATTORNEY Dec. 21, 1943.   R. P. STEADMAN ET AL   2,337,527
FEEDING MECHANISM FOR DOUGH TWISTING MACHINES
Original Filed Oct. 7, 1941    8 Sheets-Sheet 2

INVENTORS
RUFFUS P. STEADMAN
ALBERT O. RIORDAN.
BY
ATTORNEY

Dec. 21, 1943.  R. P. STEADMAN ET AL  2,337,527
FEEDING MECHANISM FOR DOUGH TWISTING MACHINES
Original Filed Oct. 7, 1941   8 Sheets-Sheet 3

INVENTORS
RUFFUS P. STEADMAN
ALBERT O. RIORDAN
BY
ATTORNEY

Dec. 21, 1943. R. P. STEADMAN ET AL 2,337,527
FEEDING MECHANISM FOR DOUGH TWISTING MACHINES
Original Filed Oct. 7, 1941  8 Sheets-Sheet 4
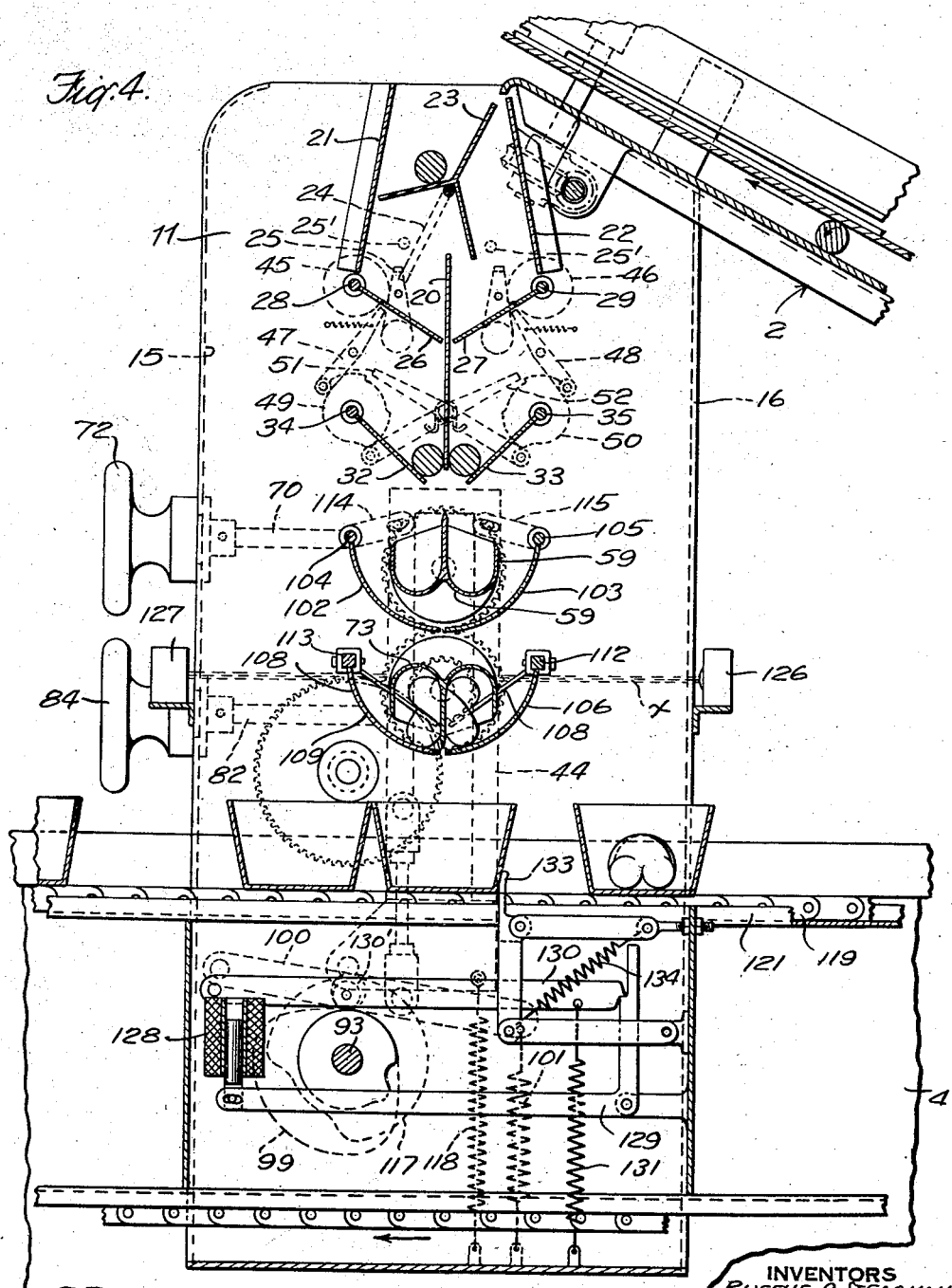
Fig. 4.
INVENTORS
RUFFUS P. STEADMAN
ALBERT O. RIORDAN
BY 
ATTORNEY Dec. 21, 1943.  R. P. STEADMAN ET AL  2,337,527
FEEDING MECHANISM FOR DOUGH TWISTING MACHINES
Original Filed Oct. 7, 1941   8 Sheets-Sheet 5

INVENTORS
RUFFUS P. STEADMAN
ALBERT O. RIORDAN.
BY Victor D. Borst
ATTORNEY

Dec. 21, 1943.  R. P. STEADMAN ET AL  2,337,527
FEEDING MECHANISM FOR DOUGH TWISTING MACHINES
Original Filed Oct. 7, 1941  8 Sheets-Sheet 6

INVENTORS
RUFFUS P. STEADMAN
ALBERT O. RIORDAN.
BY
ATTORNEY

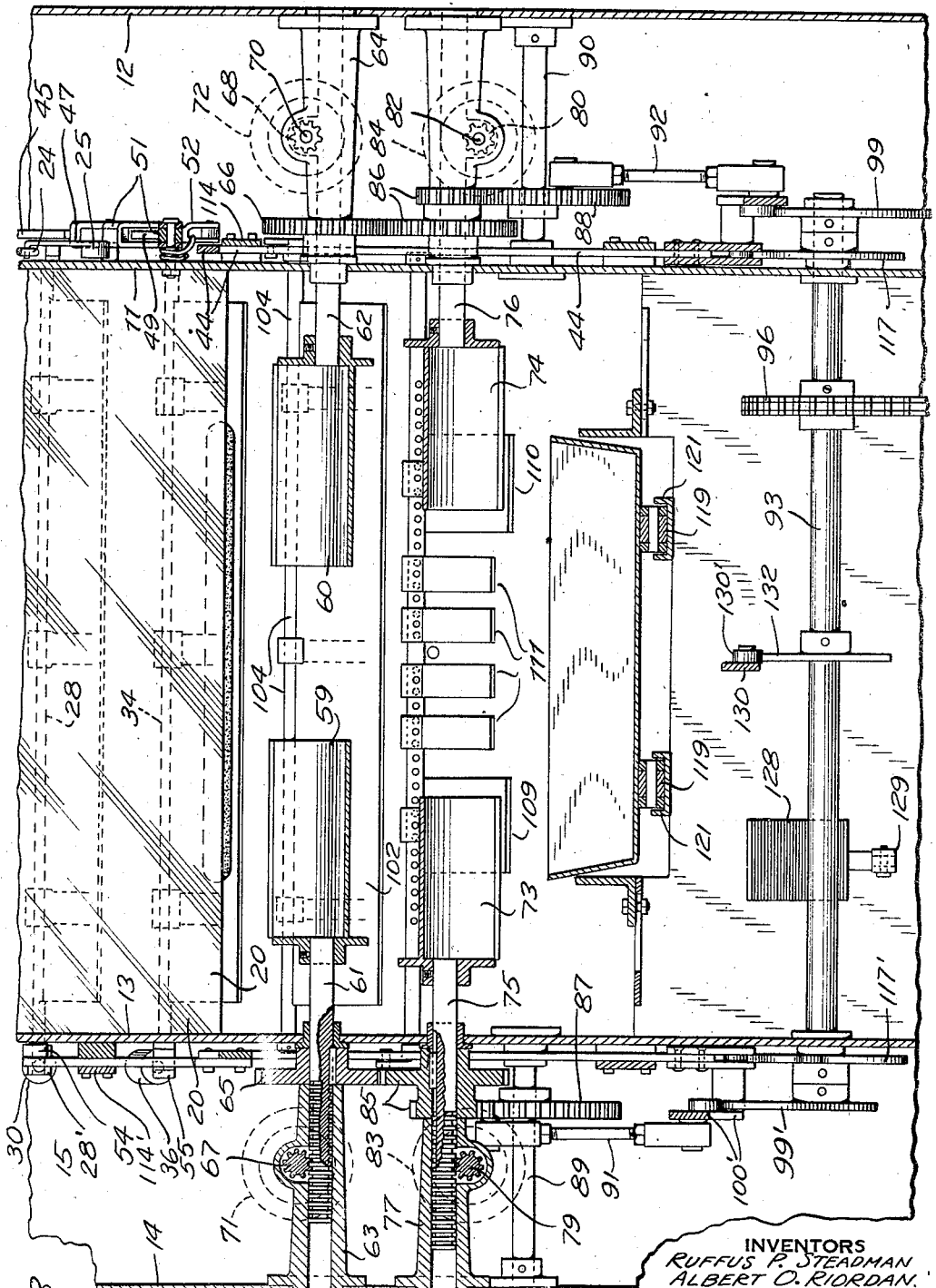

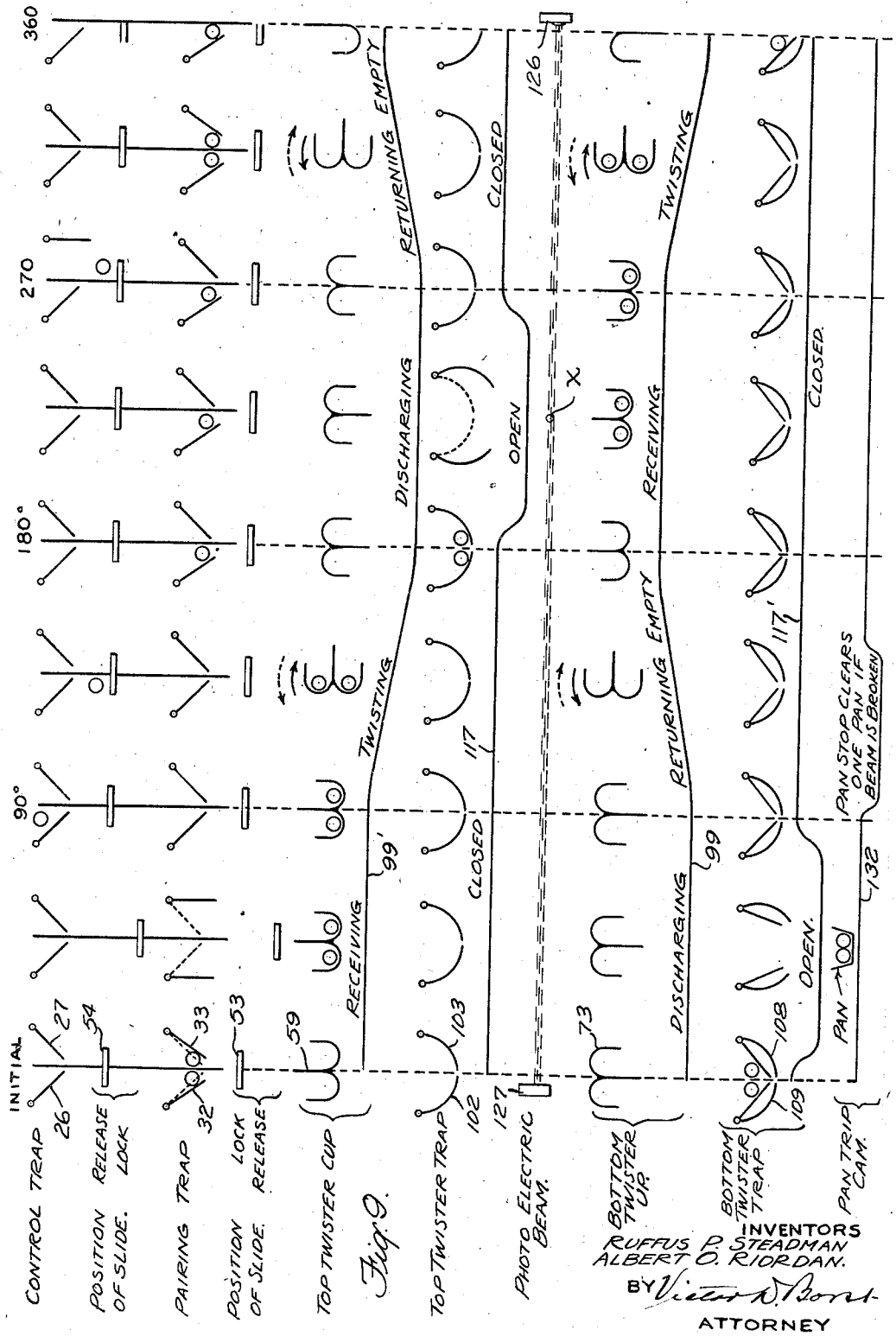

Patented Dec. 21, 1943

2,337,527

UNITED STATES PATENT OFFICE 2,337,527

FEEDING MECHANISM FOR DOUGH TWISTING MACHINES

Ruffus P. Steadman and Albert O. Riordan, Saginaw, Mich.; said Riordan assignor to Baker Perkins Inc., a corporation of New York Original application October 7, 1941, Serial No. 413,924. Divided and this application May 13, 1943, Serial No. 486,750

10 Claims. (Cl. 107—8)

This application is a division of our pending application, Serial No. 413,924, filed October 7, 1941, which discloses a dough twisting machine used in the bread baking industry to intertwine strips or rolls of unproofed dough as they come from the molder to make what is known as a twisted loaf. The complete machine includes, in addition to the twisting mechanism, a conveyor for bringing the strips or rolls from the molder to the hopper, and a pan conveyor which is indexed or intermittently advanced the right amount at the proper intervals to allow the twisted loaves to be deposited in pans and thence delivered automatically.

The twisting is done in two stages, the strips which are to constitute a loaf being deposited first in an upper pair of alined cups which are rotated 180° in opposite directions and from which the partially twisted loaf is delivered on to a pair of hinged flaps or traps and thence delivered into a lower pair of alined cups which are oppositely rotated to complete the twisting. In its final twisted state the loaf is delivered thence on to a bottom pair of hinged flaps or traps which in turn open and drop the loaf into a pan that has paused under the bottom cups in receiving position.

In addition to the twisting cups with their individual receiving flaps or traps and the actuating means therefor, the twisting mechanism as a whole includes what is termed a distributor-loader, the function of which is to feed the strips through in pairs from the conveyor to the twister. This pairing and feeding mechanism constitutes the subject matter of this application.

In a convenient form of the invention a weight actuated gate member causes the dough rolls as they come into the hopper to pass alternately on opposite sides of a partition and two or more pairs of hinged flaps or traps control the passage of the paired rolls to the first twister. These traps are biased to closed position and open under the weight of a roll of dough, but the traps of the successive stations interlock so that a roll cannot pass into a trap that is already occupied. Also each pair of traps after the first can only open together thus assuring that the pairing is maintained.

The illustrated embodiment of the invention will now be described after which the invention will be pointed out in claims.

Fig. 1 is a side elevation of a complete unit embodying the invention.

Fig. 4 is a sectional elevation on the line 4—4 of Fig. 2.

Fig. 8 is an enlarged transverse sectional elevation of the twister mechanism with a portion at the top and bottom broken away.

Fig. 9 is a schematic representation of the twister mechanism through one complete cycle of operation.

Figure 2:
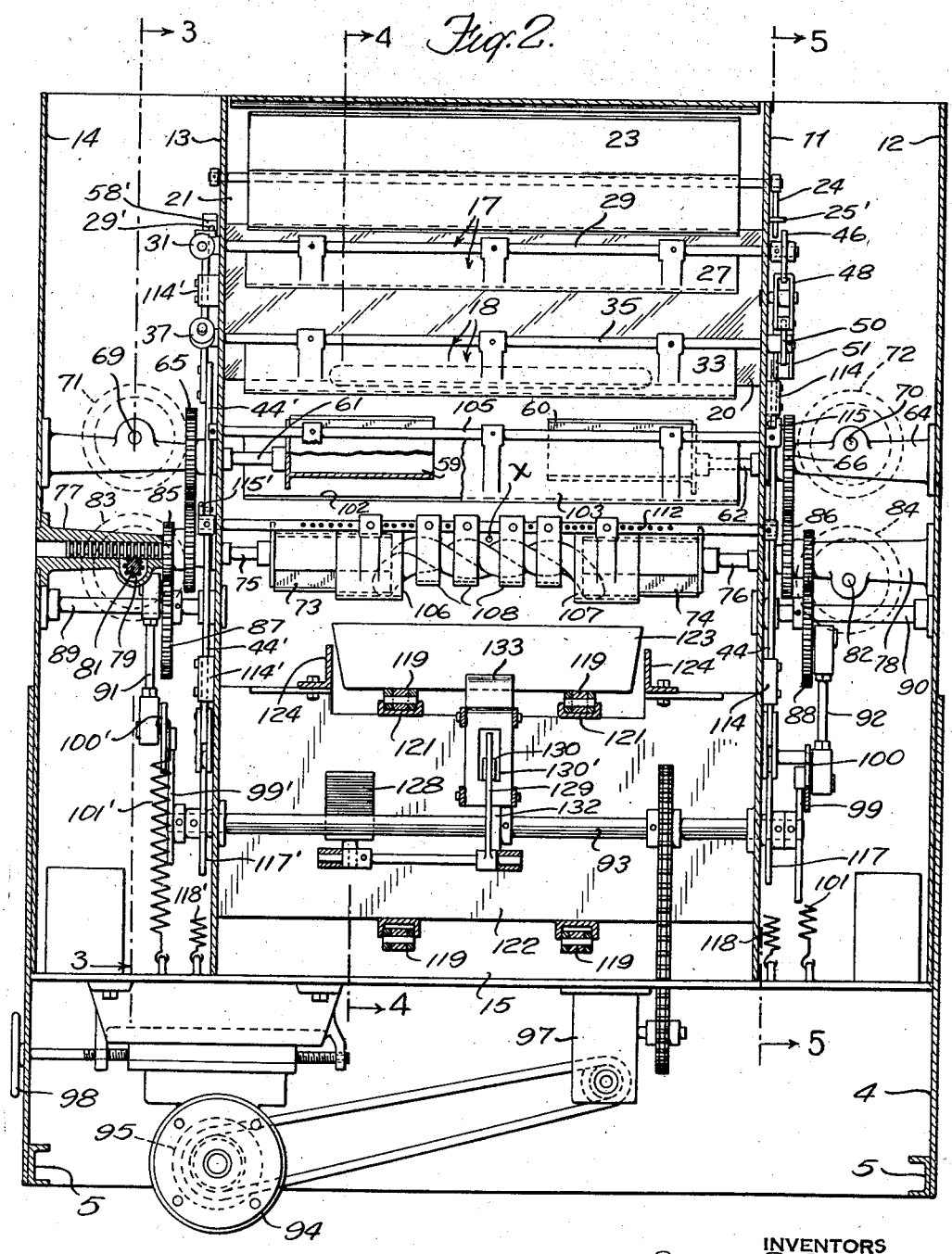
Fig. 2 is a transverse sectional elevation of the twisting mechanism on the broken line 2—2 of Fig. 1.

The complete apparatus as shown in Fig. 1 is a unit consisting of a base structure 1, an extender conveyor 2 and the twisting mechanism 3, together with two motors and driving connections. The base structure is an elongated, oblong member composed of sheet metal 4 on its sides and ends strengthened with a channel frame 5, and open at its bottom and provided with a panning conveyor on its top. The frame is mounted on casters disposed so as to provide a three point support which will best adapt itself to an uneven floor. The apparatus is thus rendered mobile and may be rolled to a position in front of the discharge end of a conventional prime loaf molder and securely clamped to it to prevent subsequent shifting or misalignment.

When so placed the extender conveyor receives the molded dough pieces from the prime molder (not shown), elongates them and delivers them into the twister mechanism where they are twisted together in pairs and delivered into pans which are advanced in proper order to the twisted loaf receiving station and delivered therefrom to the discharge point of the machine.

The twister mechanism will first be described. This mechanism is arranged so that the molded dough pieces pass through by gravity, first being paired and then accurately timed in their delivery to the twisting units. There are two twisting units, numbered generally 6 and 7, and above these are the stations constituting the distributor-loader. This may consist of two or more stations depending upon the degree of precaution felt necessary to assure orderly passage of the dough pieces through the mechanism. With a reliably operating prime molder and extender conveyor and proper flexibility in the relative speed adjustment of the twister mechanism, we have found two stations to be sufficient.

As shown for example in Fig. 2, the twister mechanism is contained in an upright, sheet metal frame the bottom of which fits and is secured within the side panels 4 of the base structure, and which extends substantially above the base. The frame is composed essentially of two side structures each of which is double walled. As viewed in Fig. 2 the right side frame structure consists of the two spaced walls 11 and 12 and the left side structure has walls 13 and 14. These are closed in front and rear by walls 15 and 16. At least one of the walls may be provided with removable portions to afford access to the interior of the enclosed side structure.

The distributor-loader has two stations numbered generally 17 and 18. Each station consists of a trap formed of a pair of pivoted doors or trap members that meet in the middle on opposite sides of a central partition 20. The top trap 17 is a control trap and controls the escape of dough pieces from a hopper formed by the two transverse plates 21 and 22 that extend between the side frame structures and are spot welded or otherwise secured to the walls 11 and 13. The extender conveyor 2 delivers into this hopper.

Figure 5:
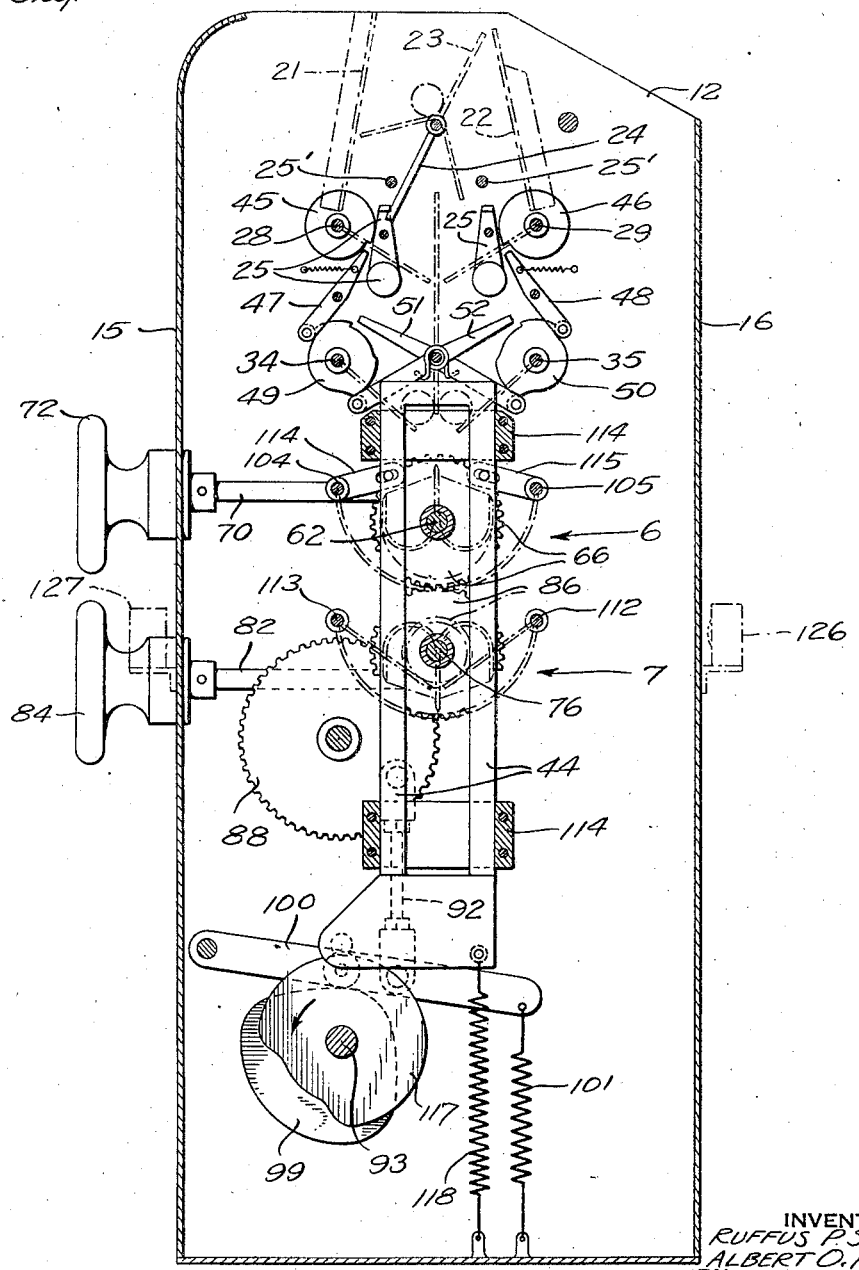
Fig. 5 is a sectional elevation on the line 5—5 of Fig. 2.

The incoming rolls of dough are directed alternately on opposite sides of the partition 20 by a pivoted, dough weight operated gate member 23 of well known design. This gate has two legs flaring from the pivot, and an intermediate upstanding vane of a radial length to strike against the sides of the hopper and allow the gate to rotate far enough in each direction to cause the respective leg to clear the hopper side somewhat more than the diameter of a dough roll and bring the other leg up close to its side of the hopper. In the position shown in Fig. 4 the incoming dough roll will go to the left and in so doing will reverse the gate so that the next dough roll will go to the right. To prevent rebound an external arm 24 on the pivoted axis of the gate is positioned to strike pivoted weights 25 (Fig. 5) which absorb the inertia. If desired, stop pins 25' on the side wall 11 may also be provided for the arm 24.

The trap members 26 and 27 for the control station 17 are fastened on transverse rock-shafts 28 and 29 that bear in the sides 11 and 13. Weights 30 and 31 bias these trap members to closed position.

The station 18 is directly underneath station 17 and has trap members in all substantial respects like those of station 17. This is the pairing station, that is it dumps when and only when there is a dough roll on both sides of the partition 20. The trap members 32 and 33 are fixed on rock-shafts 34 and 35 parallel with shafts 28 and 29 and also bearing in the sides 11 and 13. Weights 36 and 37 bias these trap members to closed position.

The weights 30, 31, 36 and 37 are slightly in excess of the weight of the trap, and hence the traps of stations 17 and 18 are gravity operated to the closed position, there being an interlocking arrangement which will later be described that prevents untimely opening of one of these trap members under the weight of a roll of dough. Together these two traps constitute what we term the distributor-loader of the twister mechanism.

It is obviously necessary that the control trap members 26 and 27 be prevented from opening while the trap members 32 and 33 are occupied. Also in order that station 18 shall pair the dough rolls it is necessary to prevent one from opening without the other. The interlocking arrangement to effect these results is shown in elevation in Fig. 5. On the end of the shafts 28 and 29 against the outer face of the side wall 11 are fixed one-toothed ratchets 45 and 46. Detents 47 and 48 are pivoted in position to cooperate with these ratchets to prevent rotation of the shafts 28 and 29.

On the corresponding end of shafts 34 and 35 are cam members 49 and 50 also having a single ratchet tooth. Cam rollers on the ends of detents 47 and 48 engage one edge cam portion of cams 49 and 50, respectively, the cams being so formed that the detents are swung out of engagement with their respective teeth on the ratchets 45 and 46 when the trap members 32 and 33 are in their biased positions, that is, when the station 18 is unoccupied. On a slight turning of the shafts 34 and 35, through approximately 15°, caused by the weight of the dough piece in the pairing trap, the cam rollers of the detents 47 and 48 roll off the high part of their cams and springs draw the detents into locking position. This is the position shown in Fig. 5.

In a similar manner the pairing trap members 32 and 33 mutually interlock each other so that they can only open together. Crossed spring biased pivoted detents 51 and 52 coact with the single ratchet tooth on cams 49 and 50, respectively, to limit the free rotation of the shafts 34 and 35 to approximately 15°, or at most less than enough to let a dough roll through. This slight rotation, which of course occurs only under the influence of the weight of a dough roll, is enough to lock the shaft 28 or 29 immediately above. At the same time cam rollers on the detents 51 and 52 engage another cam portion on the respective cams 49 and 50 and are on the low part of the cams in the unoccupied position of the members 32 and 33 and are on the high part when the cams are rotated 15°. That is the condition shown in Figs. 4 and 5 when the cams have swung the detents 51 and 52 out of locking position.

Thus it will be seen that shaft 34 controls the movement of shafts 28 and 35, and shaft 35 controls the movement of shafts 29 and 34.

Figure 6:
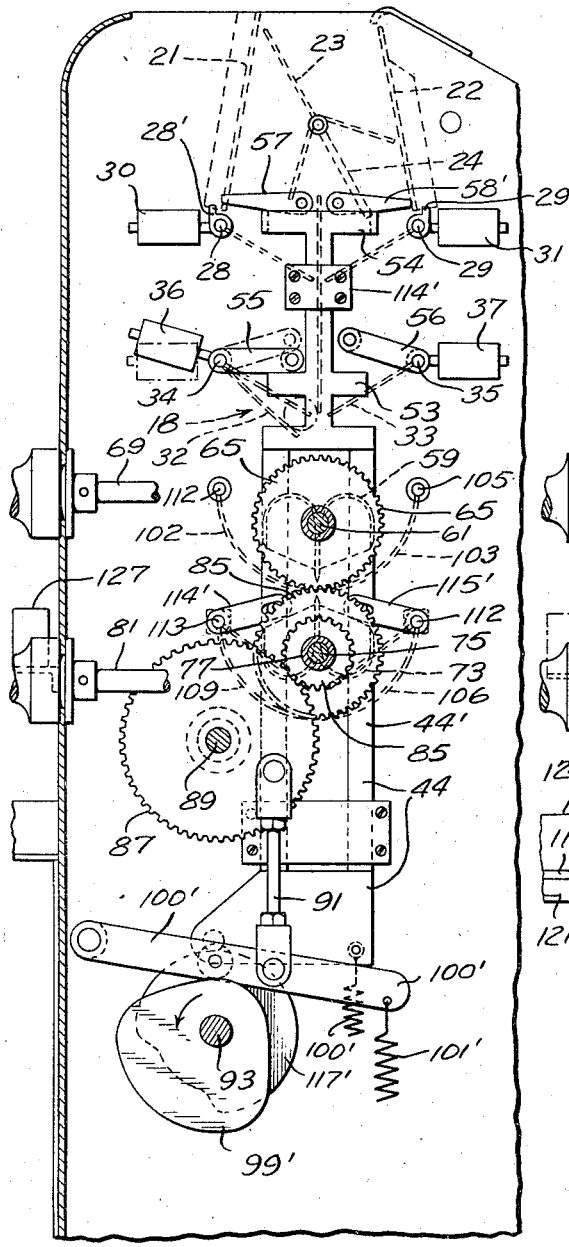
Fig. 6 is a view similar to Fig. 3 but showing the parts in their position at a different point in the cycle of operation.

In addition to the safeguard afforded by this mutually interlocking arrangement of the control and loader traps, an additional safeguard is provided that is positively controlled in timed relation to the operation of the twisters and restrains the opening of these traps to their properly timed sequence in the operation of the mechanism. As will be later more particularly described, there is a vertically reciprocating cam operated slide immediately outside each side wall 11 and 13. The cam slide adjacent side wall 11 is numbered 44, and the cam slide adjacent side wall 13 is numbered 44'. The additional safeguard controlled in timed relation to the operation of the twisters is effected by the cam operated slide 44'. This slide and its function will be fully described hereinafter, but at this point it will be noted that it has at its top an extension (Figs. 3 and 6) on which are two spaced cross arms 53 and 54. On the same end of the shafts 34 and 35 are arms 55 and 56, respectively, which are normally in the position in which arm 56 is shown in Fig. 6. The cross arm 53 in the up position of the slide 44' allows the shafts 34 and 35 to rotate the 15° or thereabouts above mentioned before the arms 55 and 56 engage the cross arm 53 and further rotation is then prevented until the slide 44' descends.

Detents 57 and 58 normally engage fingers 28' and 29' on the shafts 28 and 29 and lock the shafts against rotation. However the cross arm 54 lifts the detents 57 and 58 out of the paths of the fingers 28' and 29' when the slide 44' is in up position. Thus when the slide 44' is in up position the control trap is released for opening and the loader trap is prevented from opening and is thus held ready to receive dough rolls from the control trap. Conversely when the slide 44' is down the control trap is locked shut and the loader trap is free to open. Thus when the trap members 32 and 33 are open, the trap members 26 and 27 are by these means as well as by the detents 47 and 48 prevented from opening and delivering directly to the loader trap 18.

From the loader trap 18 the pair of dough rolls are dropped into the first twisting unit 6. These twisting units, which are in general similar though differing in detail, will now be described.

The twisting elements are elongated, double, semi-cylindrical cups or trough members. Each twisting unit has two axially alined but spaced cups and in the construction shown they are oscillated through substantially 180° in opposite directions. In the inverted position each delivers the partially or completely twisted loaf into a trap which is also positively opened and closed in proper sequence.

The two cups in the upper twister unit are numbered 59 and 60 (Fig. 8). Hub plates close the outer ends of the cups and provide attachment on to their respective shafts 61 and 62. These shafts bear in castings 63 and 64 attached to the outer walls 14 and 12, respectively, and in bushings in the walls 13 and 11, respectively. Between the casting and bushing a gear wheel, numbered 65 and 66 respectively, is keyed on each shaft with sliding key.

The two shafts 61 and 62 are longitudinally adjustable in their bearings to vary the spacing between the cups and hence the tightness of the twist imparted to the dough rolls, and also to vary their relation to the vertical center line of the machine for a reason which will presently appear. To effect this adjustment a rack is formed on the shaft for at least part of its length, and pinions 67 and 68, respectively, engage these racks. These pinions are on the inner ends of shafts 69 and 70, respectivey, having hand-wheels 71 and 72 on their outer ends bearing in the front wall 15 of their respective side frame member.

The cups 73 and 74 of the lower twister unit are like the cups 59 and 60 except that they are shorter and hence are farther spaced. Their bearing and adjustment are also similar to the ones above. Their shafts 75 and 76, respectively, bear in castings 77 and 78, and their rack portions are engaged on the underside by pinions 79 and 80, respectively, on shafts 81 and 82 provided with hand-wheels 83 and 84 bearing in the front wall. Gear wheels 85 and 86 keyed with sliding keys on the respective shafts 75 and 76 mesh with the gear wheels 65 and 66, respectively.

The gear wheels 85 and 86 are double gears the pinions of which mesh with large gears 87 and 88, respectively, on shafts 89 and 90, respectively.

These large gears 87 and 88 are oscillated by connecting rods or pitmans 91 and 92, respectively, actuated from the transverse drive shaft 93 at the bottom of the frame. This drive shaft is driven from an electric motor 94 (Fig. 1) which is connected through a variable speed drive 95 to the shaft 93 through a sprocket and chain drive 96 and a reduction gear box 97 (Fig. 2). In the variable speed drive turning of the hand-wheel 98 slides the motor and vari-speed pulley along gibs and so causes the two parts of the vari-speed pulley to open or close and vary the ratio of the driving and driven pulleys.

The shaft 93 has secured on its opposite ends similar cams 99 and 99' (Figs. 2 and 8) the cam edges of which are divided into four equal quadrants. Pivoted above these cams are lever arms 100 and 100', respectively, which have cam rollers following the contour of the respective cams and are held in cam engagement by springs 101 and 101'. The lower ends of the connecting rods 91 and 92 are pivoted to the levers 100' and 100, respectively, outside the cam rollers.

The cams 99 and 99' are offset on the shaft 180° out of phase with the consequence that they oscillate the gears 88 and 87 simultaneously in opposite directions. Likewise the corresponding cups of the two twister units are set 180° out of phase, so that when the cups of one unit are upright those of the other unit are inverted, and vice versa. Likewise it is apparent that cups 59 and 60 rotate in opposite directions to each other and to the cups 73 and 74, respectively, though they all rotate the same amount since gears 65, 66, 85 and 86 have the same pitch diameters. The number of teeth on the various gears and the throw of the crank are so chosen that for each 360° rotation of the cams 99 and 99' the cups are rotated through 180° and back again.

The two twister units are bottomed by pivoted trap members. Unit 6 has trap members 102 and 103 fixed on rock shafts 104 and 105 that pivot in the side walls 11 and 13. These trap members are arcuate in cross-section and when closed they form a semi-cylindrical bottom, as distinguished from the trap members of the stations above which are plane and form a plane sided bottom sloping down to the center meeting line on opposite sides of the partition 20.

Unit 7 has a more complicated trap construction. Each trap member consists of two outer short quarter-cylindrical parts of a diameter to clear the cups 73 and 74, and between them a plurality of spaced straight fingers that meet with their opponents to form a V-trough the apex of which is some distance above the meeting line of the quarter-cylindrical parts.

Figure 3:
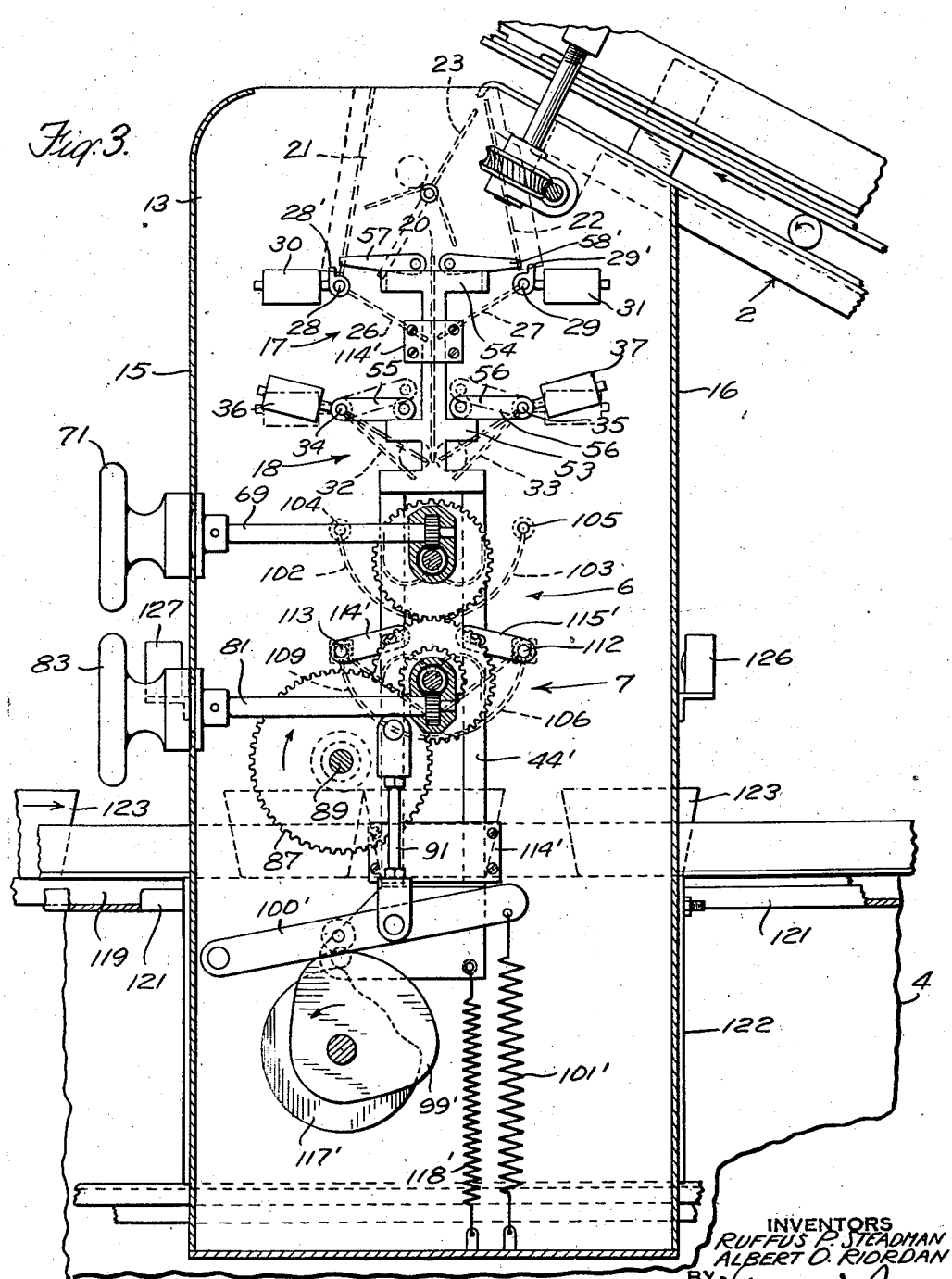
Fig. 3 is a sectional elevation on the line 3—3 of Fig. 2.

Specifically these multi-part trap members consist on the one side of the quarter-cylindrical parts 106 and 107 and the intermediate straight fingers 108 (Figs. 2 and 8), and on the other side of the quarter-cylindrical parts 109 and 110 and the intermediate straight fingers 111. These two trap members are adjustably fixed on rock shafts 112 and 113, respectively (Figs. 3 and 4).

The cam actuated slides 44 and 44' have previously been referred to. They are disposed on the outer faces of side walls 11 and 13, respectively, and are constrained by guides 114 and 114' to slide vertically. As shown they are in the form of hollow rectangles and straddle the shafts 62 and 76 on the one side and 61 and 75 on the other side.

The rock shafts 104 and 105 are operatively coupled to slide 44 by links 114 and 115, and on the other side the rock shafts 112 and 113 are operatively coupled to slide 44' by links 114' and 115'. Therefore it is clear that the raising and lowering of slide 44 will close and open the top twister trap, and the raising and lowering of slide 44' will close and open the bottom twister trap.

These slides are operated by cams 117 and 117' on the shaft 93 just outside the sides 11 and 13, respectively. These cams are similar in shape and have a high dwell of 270°, a low dwell of 45°, and a rise and fall of 22½° each. They are engaged by rollers on the respective slides 44 and 44' which are urged down into cam engagement by springs 118 and 118'.

The two cams 117 and 117' are angularly offset 180° with the result that the opening of the traps controlled thereby will occur 180° apart.

Underneath the bottom twister unit runs the panning conveyor 119. This conveyor is a continuous link chain conveyor running over pulleys supported in the top of the base 1. One of these pulleys is driven through a reduction sprocket and chain drive from a motor 120 mounted in the base (Fig. 1). The chain runs in channel guides 121 secured on top and bottom of transverse plates 122 (Figs. 2 and 3) in the base and contacting the walls 15 and 16 of the twister frame. The pans 123 are fed in from the front of the machine and are carried along by the conveyor until they are stopped by a retractable stop finger or trigger in their path located to bring a pan to rest immediately underneath the bottom twister unit. As long as the finger protrudes the conveyor slides under the pans but as soon as the finger is retracted the pans move with the conveyor until stopped again by the finger.

The pans are guided laterally by adjustable angle members 124 which are secured on top of the plates 122 and made adjustable to provide for different length pans and hence different size loaves.

Automatic means are provided to index or advance the pans one step at a time at proper intervals, the empty pans being thus brought up to loading position and the filled pans being taken on for manual or automatic removal, as for example, by a deflector 125.

The construction shown for automatically indexing the pans is controlled by a photoelectric cell. This mechanism will now be described.

On a bracket on the wall 16 is a source of light 126 (Figs. 3 and 4) which directs a horizontal beam of light $x$ from rear to front between the two twister units 6 and 7 so as to be interrupted by a partially twisted loaf dropping from the trap of unit 6 into the cups of unit 7. This beam falls upon a photoelectric cell 127 which controls a solenoid 128 (Fig. 4). The armature of this solenoid controls a bell-crank lever 129 the upright leg of which provides a latch for a pivoted lever 130 the free end of which is urged downwardly by a spring 131.

A pan indexing cam 132 is secured on the shaft 93 and is engaged by a roller 130' on the lever 130. When the roller rides into a depression in the cam the free end of the lever 130 will if released by the latch be drawn down by the spring 131 and depress a stop finger or trigger 133. As shown in Fig. 2 the trigger is in the form of a hollow oblong and the lever extends through the opening in the trigger and will depress it when other conditions permit it. The trigger is mounted so as to have substantially vertical movement and is urged upwardly into the path of the pans by a spring 134 (Fig. 4).

When a loaf drops from the upper to the bottom twister unit and breaks the beam of light the photoelectric cell causes the solenoid 128 to be energized and attract its armature and rock the latch arm to the right and unlatch lever 130. This lets the roller 130' ride on the surface of cam 132 but nothing occurs until the roller rides into the cam depression. Then the spring 131 pulls the free end of lever 130 down and retracts the trigger 133. By that time the second twisting is done and the loaf is delivered into the pan underneath unit 7. The pan being now unrestrained, it moves along with the chain conveyor. The trigger is promptly released since the cam depression extends but a short angular distance on the periphery of the cam, and the trigegr rides underneath the pan until it gets out of the way when it snaps back into the path of the next pan which is empty and which is thus held to take its loaf. The operation is then repeated.

Fig. 9 illustrates diagrammatically the sequence of steps. This is a development of a 360° cycle and the last vertical line therefore represents a recurrence of the same condition as exists at the first line. The intermediate vertical lines represent divisions into successive 90° intervals.

First it will be seen that the pairing and loader trap 18 is occupied and cam 117' is just about to allow this trap to open and let the pair of dough rolls drop into the top twister unit 6. This is the condition shown in Fig. 3, for example. At this point the cups 59 and 60 are upright, the trap for this unit is closed, cups 73 and 74 are inverted and the trap for that unit is also just about to be opened since the same cam controls it as controls the pairing and loader trap 18.

During the next quadrant the slide 44' drops, the loader trap 18 and the bottom twister trap are opened and their loads discharged, the one to the top twister cups and the other to the waiting pan.

During the next quadrant the top twister cups twist and dump, the bottom twister cups return to upright and the pan is indexed. This is the condition shown in Fig. 6.

Figure 7:
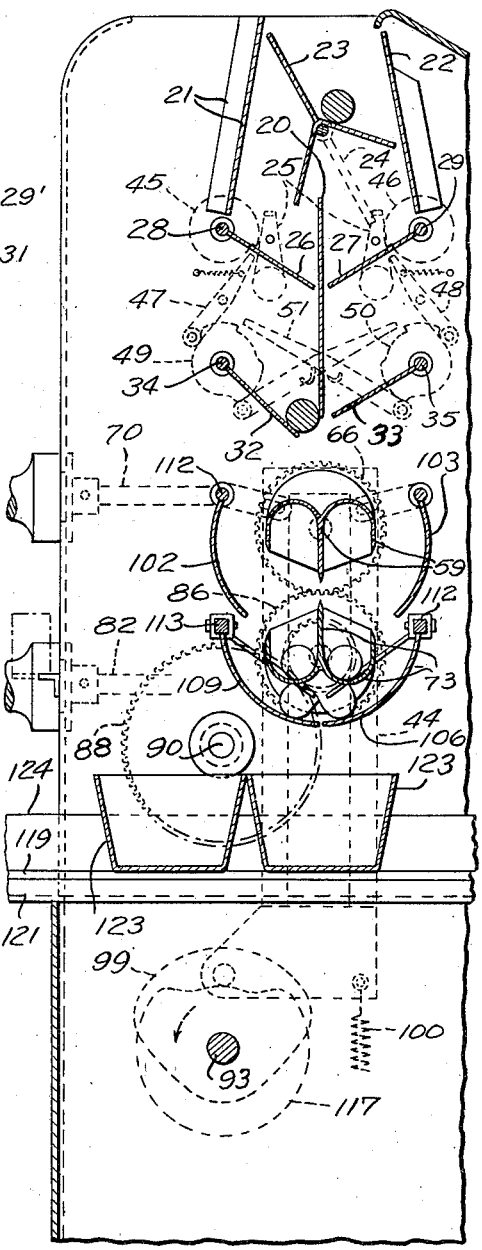
Fig. 7 is a view similar to Fig. 4 but showing the parts in their position at still another point in the cycle of operation.

During the next quadrant the top twister trap is opened by slide 44 and the partially twisted loaf is delivered to the bottom cups. This is the condition shown in Fig. 7.

During the next quadrant the twisting is completed by the bottom cups and a pair of dough rolls is received by the loader trap, with the result that conditions are as they were at the start.

The operation of the mechanism as a whole will be obvious from the above description. Dough rolls from a molder (not shown) are delivered at determined frequency to the extender-conveyor 2 and are delivered by the conveyor at the predetermined intervals into the hopper, and are directed by the gate member 23 alternately and successively on opposite sides of the partition 20. If the cam slide 44' is up, as shown in Fig. 3, the traps 26, 27 of the hopper are free to open under the weight of the rolls so far as the detents 57, 58 are concerned, but in the condition shown in Fig. 3 the hopper traps are locked by the detents 47, 48 (Fig. 5) due to the fact that the traps of the loader station 18 are occupied and hence are rotated substantially 15°.

In 22½° further movement of the cam 117' the slide 44' drops and the traps of the loading station open. This also rotates the traps 106, 107, 109, 110 of the bottom twister station 7 to open position. Coincidentally the hopper traps 26 and 27 are locked by the dropping of the detents 57, 58. In the next quadrant the slide 44' is raised and in the following quadrant the slide 44 is dropped and the traps 102, 103 of the upper twister station 6 are opened.

While in the machine shown and above described, the pairing and feeding mechanism is functionally related to and cooperates with the twisting mechanism, it is apparent that its function may be divorced from the twisting operation and, in fact, that the twisting may be omitted. If it be desired, for example, to deposit pairs of untwisted dough pieces into the successive pans, the twisting cups may be removed. Then the two pieces of dough will go directly from the pairing trap to the top twister trap, and from the top twister trap to the bottom twister trap and from thence into he pan. The only function that is omitted is the twisting.

Also it will be evident that the machine can be used to deposit a single piece of dough into each pan and thus become a straight panning device. For such conversion it is only necessary to remove the partition 20 and remove the twisting cups and regulate the speed of the conveyor.

Therefore it will be understood that the definition in the claims of the mechanism as a component of an apparatus for twisting together rolls of dough is intended to be permissive and not limiting.

It will further be understood that the pivoted distributor or gate member 23 may be mechanically operated through means controlled by the movement of the dough pieces other than gravity, and it is intended that the definition of the distributor as weight actuated shall comprehend any means controlled by the dough pieces.

Also it will be understood that the description of the partition 20 as vertical is not intended to be limiting but to comprehend such approximations to the vertical as will properly distribute the dough pieces on the trap members.

In fact it is possible to dispense with the partition and employ instead suitable means, for example, attached to the traps to prevent the dough pieces from rolling to the center while the traps are in receiving position but removed when the traps are in discharge position.

It is obvious that various other modifications may be made in the construction shown in the drawings and above particularly described within the principle and scope of the invention.

We claim:

1. In an apparatus for twisting together rolls of dough fed into the apparatus, pairing and loading means for the rolls comprising a hopper for receiving the rolls, a vertical partition, a weight actuated pivoted distributor for directing the rolls successively on opposite sides of the partition, two pairs of pivoted trap members in vertical succession underneath the hopper, the trap members of each pair being on opposite sides of the partition, the trap members being biased to closed position and adapted to swing open under the weight of a roll of dough, and a locking detent for each trap member, each of the two traps of the lower pair arranged in control of the detent for the other trap of its pair and for the trap immediately above it.

2. In an apparatus for twisting together rolls of dough fed into the apparatus, pairing and loading means for the rolls comprising a hopper for receiving the rolls, a vertical partition, a weight actuated pivoted distributor for directing the rolls successively on opposite sides of the partition, two pairs of pivoted trap members in vertical succession underneath the hopper, the trap members of each pair being on opposite sides of the partition, the trap members being biased to closed position and adapted to swing open under the weight of a roll of dough, a ratchet on the pivotal axis of each trap member, a locking detent for each ratchet biased to locking position, and cam means on the pivotal axis of each of the two lower trap members in control of the locking detent for the ratchet of the companion trap member and of the locking detent for the ratchet of the trap member immediately above it.

3. In an apparatus for twisting together rolls of dough fed into the apparatus, a frame, a pivoted bottom in the frame, a slide member on the frame operatively connected to the pivoted bottom, and pairing and loading means for the rolls comprising a hopper for receiving the rolls, a vertical partition, a weight actuated pivoted distributor for directing the rolls successively on opposite sides of the partition, two pairs of pivoted trap members in vertical succession underneath the hopper and above the pivoted bottom, the trap members of each pair being on opposite sides of the partition, the trap members being biased to closed position and adapted to swing open under the weight of the roll of dough, and means controlled by the slide member operative to lock the upper pair of trap members against opening movement and release the lower pair of trap members when the slide member is in one adjusted position and to release the upper pair and lock the lower pair when the slide member is in its other adjusted position.

4. In an apparatus for twisting together rolls of dough fed into the apparatus, a frame, a pivoted bottom in the frame, a slide member on the frame operatively connected to the pivoted bottom, and pairing and loading means for the rolls comprising a hopper for receiving the rolls, a vertical partition, a weight actuated pivoted distributor for directing the rolls successively on opposite sides of the partition, two pairs of pivoted trap members in vertical succession underneath the hopper and above the pivoted bottom, the trap members of each pair being on opposite sides of the partition, the trap members being biased to closed position and adapted to swing open under the weight of a roll of dough, pivoted detents biased to lock the trap members of the upper pair against opening movement, a radial arm fixed on the rotative axis of each trap member of the lower pair, and spaced extensions on the slide adapted to coact with the said detents and the said arms and positioned to remove the detents and restrain the arms in one adjusted position of the slide member and to clear the detents and arms in its other adjusted position.

5. In an apparatus for twisting together rolls of dough fed into the apparatus, a frame, two pivoted bottoms in the frame, one above the other, adapted to swing to open and closed positions, two slides, one on each side of the frame and each slide operatively connected to one of the bottoms, a power driven shaft, two cams on the shaft operative upon the respective slides and set substantially out of phase, and pairing and loading means for the rolls comprising a hopper for receiving the rolls, a vertical partition, a weight actuated pivoted distributor for directing the rolls successively on opposite sides of the partition, two pairs of pivoted trap members in vertical succession underneath the hopper, the trap members of each pair being on opposite sides of the partition, the trap members being biased to closed position and adapted to swing open under the weight of a roll of dough, locking devices for each pair of trap members, and extensions on one of the slides arranged in control of the locking devices.

6. In an apparatus for twisting together rolls of dough fed into the apparatus, a frame, two pivoted bottoms in the frame, one above the other, adapted to swing to open and closed positions, two slides, one on each side of the frame and each slide operatively connected to one of the bottoms, a power driven shaft, two cams on the shaft operative upon the respective slides and set substantially out of phase, and pairing and loading means for the rolls comprising a hopper for receiving the rolls, a vertical partition, a weight actuated pivoted distributor for directing the rolls successively on opposite sides of the partition, two pairs of pivoted trap members in vertical succession underneath the hopper, the trap members of each pair being on opposite sides of the partition, the trap members being biased to closed position and adapted to swing open under the weight of a roll of dough, a ratchet on the pivotal axis of each trap member, a locking detent for each ratchet biased to locking position, cam means on the pivotal axis of each of the two lower trap members in control of the locking detent for the ratchet of the companion trap member and of the locking detent for the ratchet of the trap member immediately above it, and means controlled by one of the slide members operative to lock the upper pair of trap members against opening movement and release the lower pair of trap members when the slide member is in one adjusted position and to release the upper pair and lock the lower pair when the slide member is in its other adjusted position.

7. In an apparatus for twisting together rolls of dough fed into the apparatus, a frame, two pivoted bottoms in the frame, one above the other, adapted to swing to open and closed positions, two slides, one on each side of the frame and each slide operatively connected to one of the bottoms, a power driven shaft, two cams on the shaft operative upon the respective slides and set substantially out of phase, and pairing and loading means for the rolls comprising a hopper for receiving the rolls, a vertical partition, a weight actuated pivoted distributor for directing the rolls successively on opposite sides of the partition, two pairs of pivoted trap members in vertical succession underneath the hopper, the trap members of each pair being on opposite sides of the partition, the trap members being biased to closed position and adapted to swing open under the weight of a roll of dough, a ratchet on the pivotal axis of each trap member, a locking detent for each ratchet biased to locking position, cam means on the pivotal axis of each of the two lower trap members in control of the locking detent for the ratchet of the companion trap member and of the locking detent for the ratchet of the trap member immediately above it, pivoted detents biased to lock the trap members of the upper pair against opening movement, a radial arm fixed on the rotative axis of each trap member of the lower pair, and spaced extensions on one of the slides adapted to coact with the said detents and the said arms and positioned to remove the detents and restrain the arms in one adjusted position of the slide member and to clear the detents and arms in its other adjusted position.

8. In an apparatus for handling rolls of dough fed into the apparatus, pairing and loading means for the rolls comprising a hopper for receiving the rolls, two pairs of pivoted trap members in vertical succession underneath the hopper, the trap members of each pair being biased to closed position and adapted to swing open under the weight of a roll of dough, means in the hopper for directing the rolls successively on the traps of the upper pair, and a locking detent for each trap member, each of the two traps of the lower pair arranged in control of the detent for the other trap of its pair and for the trap immediately above it.

9. In an apparatus for handling rolls of dough fed into the apparatus, pairing and loading means for the rolls comprising a hopper for receiving the rolls, two pairs of pivoted trap members in vertical succession underneath the hopper, the trap members of each pair being biased to closed position and adapted to swing open under the weight of a roll of dough, means in the hopper for directing the rolls successively on the traps of the upper pair, a ratchet on the pivotal axis of each trap member, a locking detent for each ratchet biased to locking position, and cam means on the pivotal axis of each of the two lower trap members in control of the locking detent for the ratchet of the companion trap member and of the locking detent for the ratchet of the trap member immediately above it.

10. In an apparatus for handling rolls of dough fed into the apparatus, pairing and loading means for the rolls comprising a hopper for receiving the rolls, a partition, a pivoted distributor for directing the rolls successively on opposite sides of the partition, two pairs of pivoted trap members in vertical succession beneath the hopper, the trap members of each pair being on opposite sides of the partition, the trap members being biased to closed position and adapted to swing open under the weight of a roll of dough, and a locking detent for each trap member, each of the two traps of the lower pair arranged in control of the detent for the other trap of its pair and for the trap immediately above it.

RUFFUS P. STEADMAN.
ALBERT O. RIORDAN.